(12) United States Patent
Stoner

(10) Patent No.: US 6,609,660 B1
(45) Date of Patent: *Aug. 26, 2003

(54) OPTICAL DEVICE FOR INCREASING THE APPARENT RESOLUTION OF PHOTOSENSOR

(75) Inventor: Paul D. Stoner, North Canton, OH (US)

(73) Assignee: Telxon Corporation, Holtsville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/373,467

(22) Filed: Aug. 12, 1999

(51) Int. Cl.[7] ............................. G02B 26/08; G06K 7/10
(52) U.S. Cl. ............................. 235/462.22; 235/472.01
(58) Field of Search ..................... 235/472.01, 462.22, 235/462.23, 462.24, 462.12, 462.01

(56) References Cited

U.S. PATENT DOCUMENTS

| 4,831,275 | A | * | 5/1989 | Drucker | ................ | 250/566 |
|---|---|---|---|---|---|---|
| 5,280,164 | A | | 1/1994 | Barkan | ................ | 235/467 |
| 5,457,308 | A | * | 10/1995 | Spitz et al. | ................ | 235/462 |
| 5,576,529 | A | * | 11/1996 | Koenck et al. | ................ | 235/472 |
| 5,627,366 | A | * | 5/1997 | Katz | ................ | 250/234 |
| 5,864,128 | A | | 1/1999 | Plesko | ................ | 235/462 |
| 5,932,860 | A | | 8/1999 | Plesko | ................ | 235/454 |
| 6,006,992 | A | * | 12/1999 | Watanabe et al. | ...... | 235/462.12 |
| 6,053,408 | A | * | 4/2000 | Stoner | ................ | 235/462.22 |
| 6,318,635 | B1 | * | 11/2001 | Stoner | ................ | 235/462.45 |
| 6,318,637 | B1 | * | 11/2001 | Stoner | ................ | 235/472.01 |
| 6,321,988 | B1 | * | 11/2001 | Merchant et al. | ...... | 235/462.12 |

* cited by examiner

*Primary Examiner*—Karl D. Frech
(74) *Attorney, Agent, or Firm*—Amin & Turocy, LLP

(57) ABSTRACT

A dataform reading module includes at least one photosensor providing a plurality of different zones for image capture. The reader module further includes a plurality of optics for focusing a respective image representing a portion of a dataform taken along a target line onto a respective one of the plurality of different zones. At least two of the plurality of optics are configured to focus an image of adjacent and partially overlapping portions of the dataform taken along the target line. An illuminating device included as part of the reading module is used for illuminating the dataform.

28 Claims, 5 Drawing Sheets

OPTICAL DEVICE FOR INCREASING THE APPARENT RESOLUTION OF PHOTOSENSOR

FIELD OF THE INVENTION

The present invention relates to a portable data collection device including an imaging based dataform reader and, more particularly, to a portable data collection device including an imaging based dataform reader utilizing a multi-cuspid lens arrangement to increase the apparent resolution of a photosensor.

BACKGROUND OF THE INVENTION

Portable data collection devices are widely used in manufacturing, service and package delivery industries to perform a variety of on-site data collection activities. Such portable data collection devices often include integrated bar code dataform readers adapted to read bar code dataforms affixed to products, product packaging and/or containers in warehouses, retail stores, shipping terminals, etc. for inventory control, tracking, production control and expediting, quality assurance and other purposes.

Bar code dataforms come in a variety of different formats including one and two dimensional bar codes, matrix codes and graphic codes, as well as words and numbers and other symbols, which may be printed or etched on paper, plastic cards and metallic and other items. For example, a one dimensional bar code dataform typically consists of a series of parallel light and dark rectangular areas of varying widths. The light areas are often referred to as "spaces" and the dark areas as "bars". Different widths of bars and spaces define different characters in a particular bar code dataform.

Data originally encoded in a dataform is recovered for further use in a variety of ways. For example, a printed bar code may be illuminated to derive reflectance values which are digitized, stored in buffer memory and subsequently decoded to recover the data encoded in the bar code. The printed bar code may be illuminated using a laser, an array of LEDs, ambient light, or the like. The light reflected from the printed bar code typically is captured using a photosensor such as, for example, a CCD detector, CMOS detector, etc.

A problem associated with dataform readers in the past has been that the readers are designed to read dataforms located within a limited range from the reader. For example, a dataform reader may be designed to read dataforms located within the range of three inches to twelve inches from the reader. The maximum distance at which a dataform reader is able to read a dataform is limited by a resolution of the photdetector used to capture the dataform. For example, using a conventional 640 horizontal pixel photosensor, one dimensional bar code dataforms can be read so long as the distance the reader is placed from the dataform is such that the 640 horizontal pixels are suitable to distinguish among the narrowest bars and spaces forming the dataform. As the dataform reader is moved further away from a dataform, the images of the bars and spaces appear smaller at the photosensor thereby limiting the range at which the dataform reader is able to read a dataform.

One way to allow the dataform reader to read the dataform at longer distances is to increase the resolution of the photosensor. For example, rather than providing 640 horizontal pixels, the photosensor may include 1000 or more horizontal pixels. In this manner, the photosensor is able to distinguish among smaller features of the dataform thereby enabling reading of dataforms located farther away. A significant drawback to increasing the number of horizontal pixels on the photosensor is that a width of the photosensor becomes proportionately larger in order to accommodate the additional pixels. As the width of the photosensor increases, so does the overall width of the reader module. Unfortunately, due to customer demand for smaller and more compact dataform readers, the ability to increase the width of the reader module is often not a feasible option.

Accordingly, there is a strong need in the art for a dataform reader which is capable of reading dataforms at longer distances which overcomes the above mentioned drawbacks and others.

SUMMARY OF THE INVENTION

In accordance with one aspect of the present invention, a range at which a dataform reader is able to read a dataform is improved by increasing an apparent resolution of a photosensor capturing the image of the dataform. The apparent resolution of the photosensor is increased by providing a reader module having two or more lenses with partially overlapping fields of views. Each field of view is set to capture a respective portion of a full dataform image. For instance, the field of view from each lens may be set to capture a respective portion of a one-dimensional bar code label.

In order to increase the apparent resolution of the photosensor, each of the lenses is preferably arranged to focus a respective image of the dataform onto different zones of the photosensor. For instance, each lens may be arranged to focus images onto rectangular shaped zones arranged vertically with respect to one another. Upon capturing an image from each lens in the different zones, the full image of the dataform is reconstructed. In particular, the images from each zone is preferable provided to an image processor whereby overlapping data from each zone is discarded and a single image representative of a combined field of view from each lens is obtained. Since an image from each lens is focused onto different zones and then combined, the apparent resolution of the photosensor is increased. For instance, if a three lens dataform reader has a two-dimensional photosensor with 640 horizontal pixels and the three lenses are arranged to project respective images on a different rectangular zone of the photosensor, the apparent horizontal resolution of the photosensor increases from 640 pixels to 1920 (640×3) pixels less the number of pixels providing overlapping data in each zone. It will be appreciated that since the photosensor itself need not be increased in width to accommodate such higher horizontal resolution imaging, the overall width of the reader module may remain unchanged. Thus, the dataform reader is able to read dataforms at longer ranges by increasing the apparent resolution of the photosensor, without increasing the overall width of the reading module itself.

According to one aspect of the invention, a dataform reading module, is provided. The dataform reading module includes at least one photosensor providing a plurality of different zones for image capture, a plurality of optics for focusing a respective image representing a portion of a dataform taken along a target line onto a respective one of the plurality of different zones, at least two of the plurality of optics configured to focus an image of adjacent and partially overlapping portions of the dataform taken along the target line, and an illuminating device for illuminating the dataform.

According to another aspect of the invention, a dataform reader for reading a dataform is provided. The dataform reader includes a hand-portable sized housing, a reading module included within the housing, the reading module including, a photosensor array having a plurality of different zones, a plurality of optics for focusing a respective image representing a portion of the dataform along a target line onto a respective one of the plurality of different zones, at least two of the plurality of optics configured to focus an image of adjacent and partially overlapping portions of the dataform along the target line, and an illuminating device for illuminating the dataform.

According to yet another aspect of the invention, a method for reading a dataform using a dataform reading module is provided. The method includes the steps of focusing a plurality of images of a dataform onto respective zones of a photosensor array, at least two of the images corresponding to adjacent and partially overlapping segments of the dataform taken along a target line, and reconstructing a final image of the dataform taken along the target line from a combination of the plurality of images provided to the respective zones.

According to still yet another aspect of the invention, a dataform reading module is provided. The dataform reading module including means for capturing images of a dataform, means for focusing images of adjacent portions of the dataform onto respective different regions of the means for capturing; and means for combining the images of the adjacent portions to a single image of the dataform.

These and other aspects, features and advantages of the invention will become better understood from the detailed description of the preferred embodiments of the invention which are described in conjunction with the accompanying drawings.

DETAILED DESCRIPTION OF THE INVENTION

Figure 1:
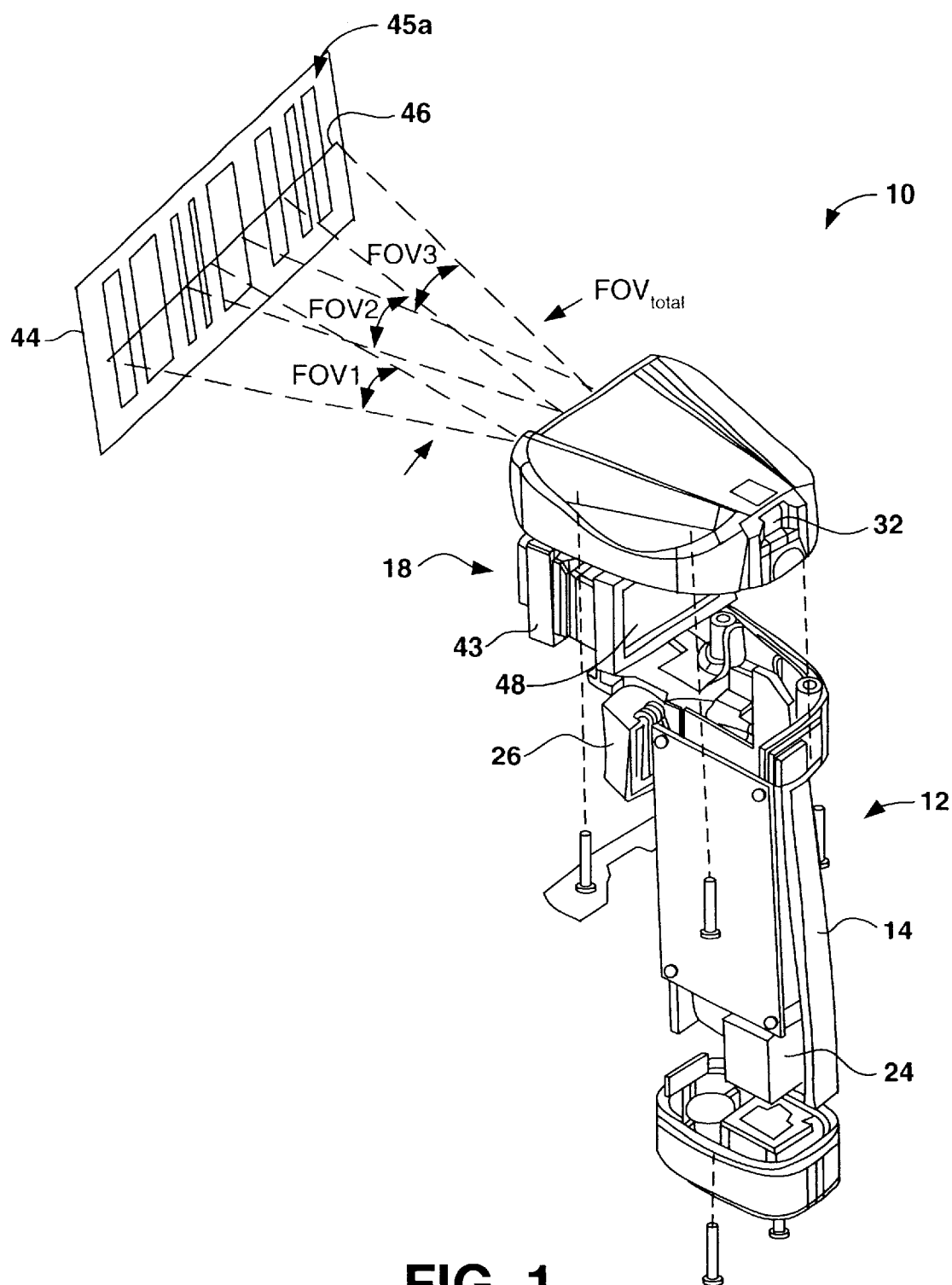
FIG. 1 is a partial exploded view of a portable data collection device in accordance with one aspect of the present invention.

The present invention will now be described with reference to the drawings wherein like reference numerals are used to refer to like elements throughout.

Turning to FIG. 1, a portable, hand held data collection device in accordance with the present invention is shown generally at 10. The portable data collection device 10 includes a photosensor array imaging assembly 18 which is capable of imaging a target dataform 45a located within an imaging target area 44 of the imaging assembly 18. As will be described more fully below, the imaging assembly 18 includes a multi-lens assembly wherein each lens has a partially overlapping field of view FOV1, FOV2, FOV3 and is arranged to focus an image received from the field of views along a target line 46 to a respective different zone of a photosensor array 48 (see FIG. 5). An image processing circuit coupled to the photosensor array 48 receives pixel data from each zone of the photosensor array 48 and reconstructs the image read by collection of lenses along the target line 46. In particular, the image processing circuit correlates the image data received from each lens in order to discard overlapping data and stream together the data across the entire field of view $FOV_{total}$ for the collection of lenses. Since each lens focuses an image on a different rectangular zone of the photosensor array 48, the apparent resolution of the photosensor array 48 in reading data along the target line 46 is increased since more pixels are available for capturing images across the entire filed of view $FOV_{total}$. This, in turn, enables the portable data collection device 10 to read dataforms at longer ranges without increasing a width of the photosensor array imaging assembly 18.

The data collection device 10 includes a housing 12 defining an interior region for containing various mechanical and electrical components as described herein. The housing 12 includes a gripping portion 14 sized to be grasped in the hand of an operator. Coupled to the housing 12 is a dataform reading switch or actuator 26. The dataform reading trigger 26 is positioned to be depressed by an index finger of the operator while the gripping portion 14 of the housing 12 is held in the operator's hand. Also supported within the housing 12 is a power source 24 such as a rechargeable battery for supplying operating power to the portable data collection device 10.

The housing 12 also includes a small opening through which a portion of an indicator light emitting diode (LED) 32 is visible. The indicator LED 32 alternates between three colors. The color green is displayed by the indicator LED 32 when the device 10 is on standby, ready for use. The color orange is displayed with the device 10 has successfully completed an operation such as decoding a target dataform. The color red is displayed when the device 10 is not ready to perform an operation.

Figure 2:
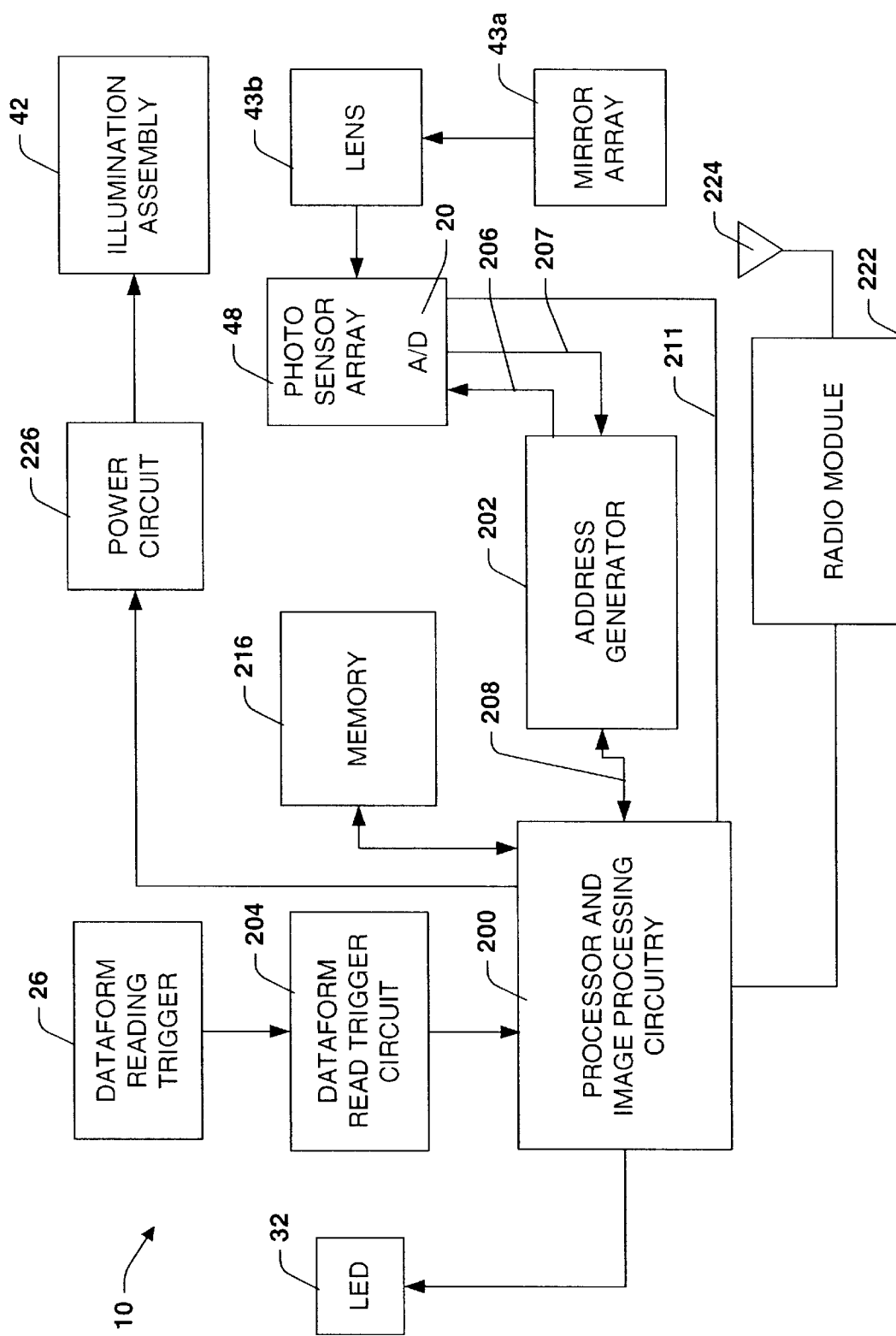
FIG. 2 is a block diagram of the components of the portable data collection device in accordance with one aspect of the present invention.

The imaging assembly 18 is disposed within a top portion of the housing 12 and includes the lens assembly 43, photosensor array 48 and illumination assembly 42 (FIG. 2). In the present embodiment of the invention, the illumination assembly 42 is a laser assembly, however, it will be appreciated that various other illumination sources such as an array of LEDs could alternatively be used.

Turning now to FIG. 2, a block diagram of the data collection device 10 is provided. A microprocessor 200 controls the various operations and performs image analysis in decoding a target dataform as is described more fully below. The microprocessor 200 is programmed to carry out the various control and processing functions using conventional programming techniques. A memory 216 coupled to the microprocessor 200 serves to store the various programs and other data associated with the operation of the data collection device 10 as described herein. A person having ordinary skill in the art will be able to program such operations without undue effort. Hence, additional detail is omitted for sake of brevity.

The microprocessor 200 is coupled to an address generator 202, via a local bus 208, which is designed to output a sequence of pixel addresses corresponding to a desired pixel data readout pattern from photosensor array 48. For example, as discussed in more detail below, the microprocessor 200 may be configured to read out consecutive horizontal lines of pixel data from multiple zones so that such pixel data can be processed to reconstruct the entire dataform provided within the field of view $FOV_{total}$ of the data collection device 10. The addresses are provided from the address generator 202 to the photosensor array 48 via an address bus 206. The photosensor array 48 provides, as its output data, pixel data on data bus 207 which corresponds to the address provided on bus 206. The address generator 202 in turn provides the pixel data to the microprocessor 200 via bus 208. Data may therefore be collected from the photosensor array 48 substantially in real time according to a predefined data readout pattern. It will be appreciated that while the present embodiment depicts the address generator 202 to be physically separated from the photosensor array 48, it is possible for both components to be provided on a single chip.

In order to carry out a dataform reading operation, the operator points the lens array 43 towards the target dataform. The operator then initiates the dataform read operation via the trigger 26 or other methods. The dataform read trigger circuit 204 generates an interrupt signal which is provided to the microprocessor 200 indicating the initiation of a dataform reading operation. The microprocessor 200 communicates with the address generator 202 via the control bus 205 which causes the address generator 202 to begin generating addresses for the predefined readout pixel pattern.

The image data from the photosensor array 48 consists of digital data indicative of the instantaneous illumination or the pixel. In the exemplary embodiment, it is assumed that the target dataform 45b is made up of a series of black and white bars/spaces. The photosensor array 48 includes an analog to digital (A/D) converter 210 therein for converting analog pixel data obtained from the addressed pixels to digital pixel data. The A/D converter 210 has adjustable gain which may be adjusted via a gain adjust control signal provided on line 211 from the microprocessor 200. The digitized pixel data from the photosensor array 48 is provided via the address generator 202 to the microprocessor 200. The microprocessor 200 evaluates the range of the acquired pixel data on-the-fly to see if the full range of the A/D converter 210 is utilized. If not, the microprocessor 200 adjusts the gain of the input to the A/D converter 210. The microprocessor 200 then proceeds to decode the image of the target dataform for the entire field of view $FOV_{total}$ as discussed in more detail below.

The data collection device 10 further includes a radio module 222 and antenna 224 for wirelessly transmitting and receiving data with remote devices. Additionally and/or alternatively, the data collection device 10 may include a serial or parallel I/O port (not shown) for communicating data with external devices.

Additionally, the microprocessor 200 is coupled to the illumination assembly 42 via power circuitry 226 which enables the microprocessor 200 to control the illumination assembly 42 to provide general illumination and targeting during operation. As mentioned above, the illumination assembly 43 of the present embodiment may use any of various light sources who's output light is sculpted to be spread across a dataform. Finally, it is noted that the microprocessor 200 is coupled to the LED 32 to adjust its color state to exhibit the current mode of operation as mentioned above.

Figure 3:
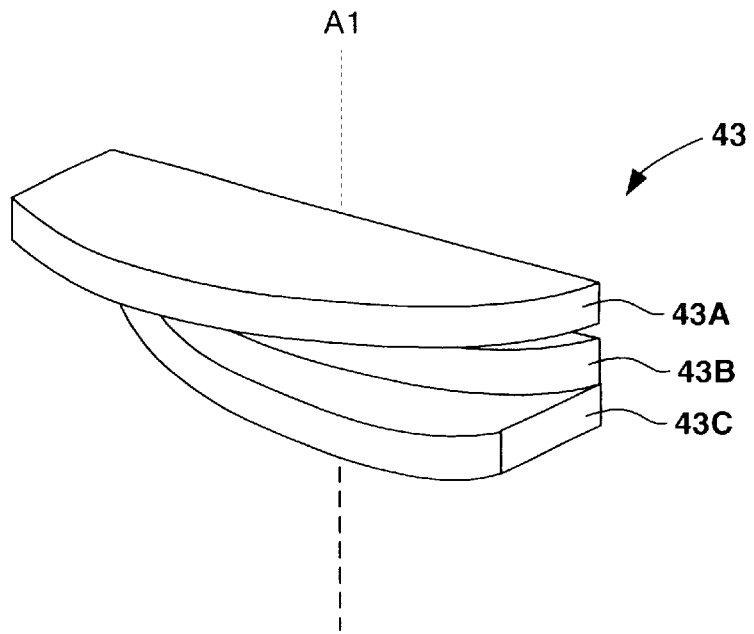
FIG. 3 is a perspective view of a lens array for use with the portable data collection device in accordance with one aspect of the present invention.
Figure 4:
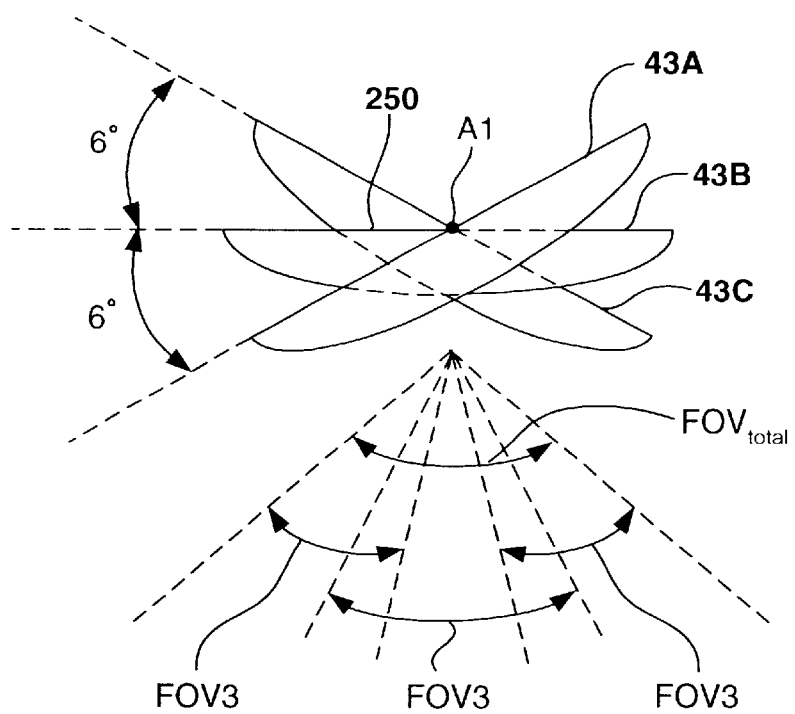
FIG. 4 is a top view of the lens array of FIG. 3.

Turning now to FIGS. 3 & 4, the lens array 43 of the present embodiment of the invention is shown in more detail. As shown, the lens array 43 of the present embodiment includes three lenses 43A, 43B, 43C stacked vertically and each arranged at an angular offset with respect to one another. For example, selecting a back plane 250 of lens 43B as a reference and axis A1 as a central axis, lens 43A is shown to be rotated counter-clockwise about axis A1 by an angle of 4° and lens 43C is shown to be rotated clockwise about axis A1 by an angle of 4°. Preferably, the angle at which each lens is rotated with respect to one another is such that the desired field of view $FOV_{total}$ for the lens array 43 is an aggregate of three adjacent and partially overlapping fields of view FOV1, FOV2, FOV3 as shown in FIG. 4. In the present embodiment, the aggregate field of view $FOV_{total}$ is 40°. By focusing the respective fields of view FOV1, FOV2, FOV3 for each lens on different zones on the photosensor array 48 which are arranged in a vertical fashion with respect to one another, an apparent resolution for the entire field of view $FOV_{total}$ is increased.

In the present embodiment, the lens array 43 is preferably a one piece assembly made from a single mold. The lenses are preferably made from glass or clear plastic, although other suitable materials could alternatively be used. By forming the lens array 43 of a single mold, the lens array 43 is easier to handle during the manufacturing process and there is a reduced possibility that the lenses 43A, 43B, 43C will accidentally be moved relative one another.

Figure 5:
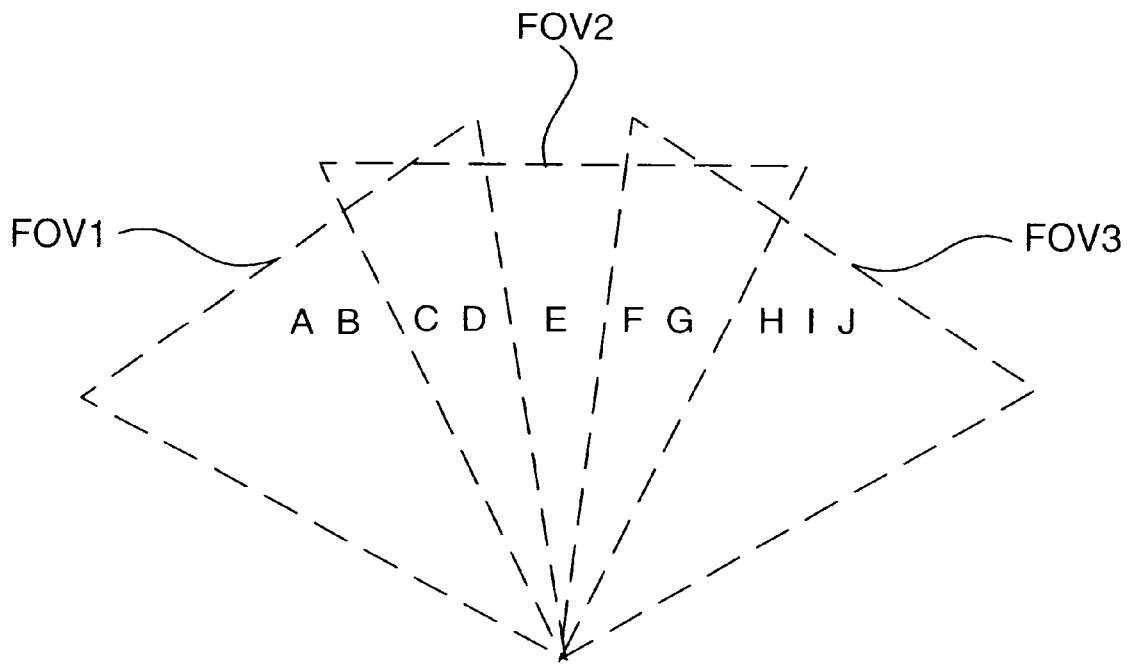
FIG. 5 is a diagrammatic view of a photosensor array capturing images of a dataform in multiple zones in accordance with one aspect of the present invention.
Figure 5:
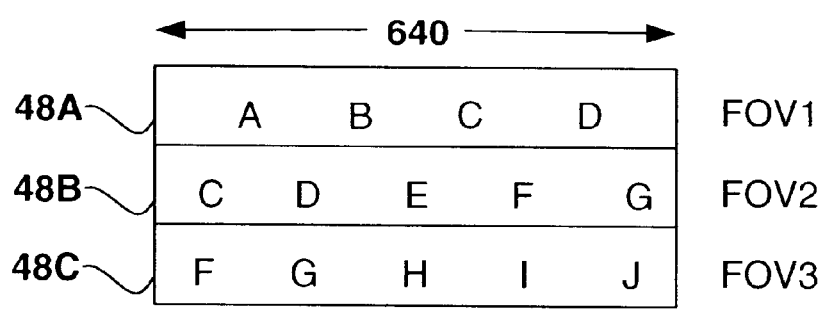

Turning now to FIG. 5, the manner in which the lens array 43 focuses an image onto respective zones 48A, 48B, 48C of the photosensor array 48 is depicted. For sake of example, it is shown that lens 43A corresponds to field of view FOV1 and projects an image onto zone 48A, lens 43B corresponds to field of view FOV2 and projects an image onto zone 48B, and lens 43C corresponds to field of view FOV3 and projects an image onto zone 48C. Due to the overlap between the fields of view FOV1, FOV2, FOV3, a portion of the dataform (which in the present example is a list of alphabetical characters) is duplicated in each zone 48A, 48B, 48C. Thus, zone 48A includes the characters "A B C D", zone 48B includes the characters "C D E F G" and zone 48C includes the characters "F G H I J". The redundancy provided by the overlapping fields of view provides added assurance that the dataform across the entire field of view is read in its entirety.

It will be appreciated that because three horizontal zones 48A, 48B, 48C of the photosensor array 48 is used to read the dataform, the total number of pixels used to capture the dataform is significantly increased. In particular, in the present embodiment, the apparent horizontal resolution of the photosensor array 48 is equal to its horizontal pixel width (640) times the number of zones utilized (3) minus the number of pixels which include duplicate data due to the overlapping field of views FOV1, FOV2, FOV3. In the present example, both zones 48B and 48C include approximately 160 pixels of overlapping data. Accordingly, the apparent horizontal resolution of the photosensor array 48 in the present embodiment is approximately 1600 pixels ((640×3)−(2×160)=1600). Due to such higher resolution, it is possible to read dataforms more accurately and at further distances than is possible with lower resolution image capture. It will be appreciated that while the present example provides for using three lenses and three zones, the present invention is intended to apply to any configuration having two or more lenses. Furthermore, while the present embodiment depicts increasing the apparent "horizontal" resolution of the photosensor array 48, it will be appreciated that the apparent resolution of the photosensor array 48 may be increased in any direction including a vertical direction or other angular directions and the present invention is not limited to increasing the apparent "horizontal" resolution.

In order to properly identify the dataform captured onto the photosensor array 48, image processing circuitry built into the processor 200 (FIG. 2) is configured to sense and discard duplicate data from each of the zones 48A, 48B, 48C and stream together the remaining pixel data to obtain the final image. The manner in which the duplicate data may be sensed and discarded is in accordance with various known video correlation techniques. For example, given the preknown angular lens arrangement, the microprocessor 200 in one embodiment is pre-programmed to know which pixels in each zone 48A, 48B, 48C correspond to overlapping data. For instance, in zone 48B, pixels 1–175 are known to be duplicate with the final 175 pixels in zone 48A, and in zone 48C pixels 1–175 are known to be duplicate with the final 175 pixels in zone 48B. Based on such preknown overlapping pixels, the image processing circuitry within the microprocessor 200 is configured to discard the overlapping pixels and stream the remaining data together to obtain the imaged dataform along the target line 46 (FIG. 1). It will be appreciated that in addition to directly discarding pixel data known to be overlapping, the image processing circuitry within the microprocessor 200 may also perform a comparison function to aid in ensuring that only duplicate data is discarded. For example, prior to discarding pixel data, data in one zone may be compared with the pixel data in a previous zone to confirm that only duplicate pixel data is discarded. In this manner, a built in safe guard is provided to protect against discarding pixels which are not duplicate.

Figure 6:
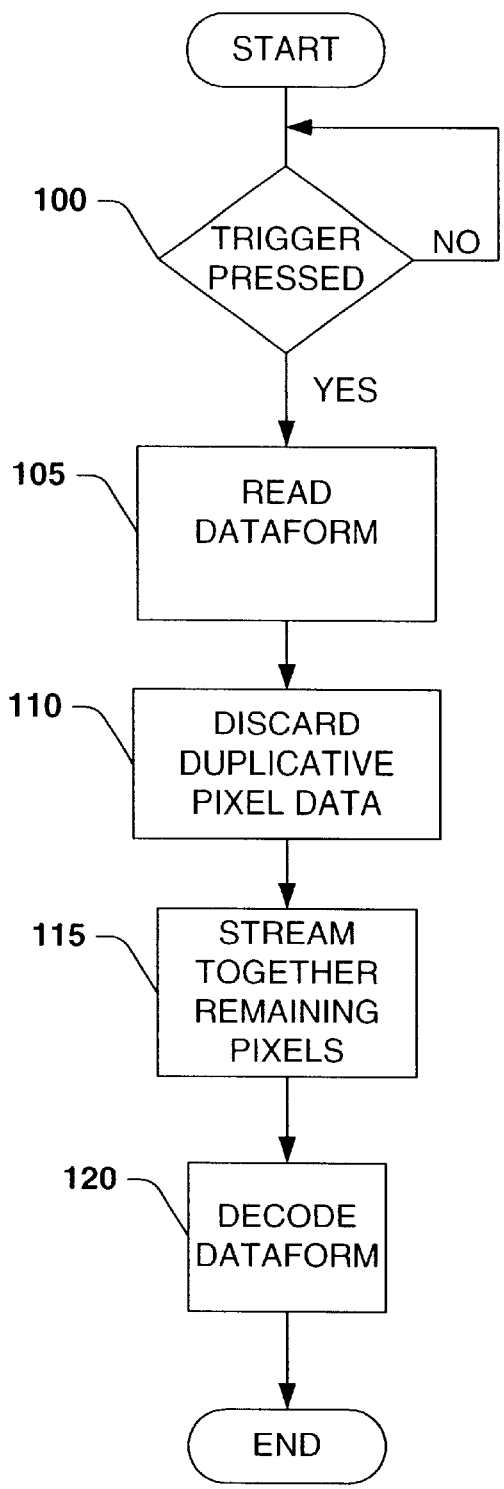
FIG. 6 is a flowchart representing the operation of the portable data collection device in accordance with one aspect of the present invention.

Turning now to FIG. 6, a flow chart depicting the operations of the microprocessor 200 in reading a dataform 45a is shown. In particular, beginning at step 100, the microprocessor 200 initially determines whether the trigger 26 has been activated. If the trigger 26 has not been activated, the processor 200 returns to step 100. If, on the other hand, the trigger 26 has been activated, the processor 200 proceeds to step 105. In step 105, the processor 200 captures the dataform image in accordance with the techniques discussed above. In particular, using a laser illumination assembly 42 and the lens array 43, the dataform 45a is captured on respective zones 48A, 48B, 48C of the photosensor array 48 so as to increase the apparent horizontal resolution of the photosensor array 48. Next, in step 110, the processor 200 receives the pixels data read out from each zone 48A, 48B, 48C and processes the data to remove duplicate pixel data resulting from overlap in the field of views of the lenses of the lens array 43. Following the removal of duplicate pixel data, the processor 200 in step 115 streams together the remaining pixel data from each zone of the photosensor array 48. Finally, in step 120, the processor 200 decodes the data stream extrapolated from the respective zones 48A, 48B, 48C. Accordingly, the data collection device 10 is able to read dataformns at a higher apparent resolution without the need to increase the width of the imaging assembly 18. As mentioned above, such higher resolution imaging allows the data collection device 10 to read dataforms 48a located farther away thereby extending the reading range of the device 10.

The invention has been described with reference to the preferred embodiments. Obviously, modifications and alterations will occur to others upon reading and understanding the preceding detailed description. For example, while the present embodiment of the invention depicts one lens array 43 focused at a predetermined range, it is possible to include two or more different lens arrays 43 each having sets of lenses varying in focus and/or magnification so that even greater ranging of the data collection device 10 is possible. Of course, in such situations the photosensor array 48 would correspondingly be of sufficient size to capture images for each of the additional lenses in the lens arrays 43. Further, while it has been described that a single photosensor array having multiple zones is used to capture the images from the respective different lens, it will be appreciated that multiple independent photosensor arrays could alternatively be used. Still further, while the above embodiments describe a system having three lenses, it will be appreciated that the present invention is intended to encompass any system having at least two lenses. Additionally, while it has been described that each lens provides for a partially overlapping field of view, it will be appreciated that the present invention is intended to cover embodiments in which some or none of the lenses has an overlapping field of view. It is intended that the invention be construed as including all such modifications alterations, and equivalents thereof and is limited only by the scope of the following claims.

What is claimed is:

1. A dataform reading module, comprising:
    at least one photosensor;
    a plurality of optics for focusing a respective image representing a portion of a dataform taken along a target line onto a respective one of a plurality of different zones of the at least one photosensor, at least two of the plurality of optics configured to focus an image of adjacent and partially overlapping portions of the dataform taken along the target line; and
    an illuminating device for illuminating the dataformn.

2. The dataform reading module of claim 1, wherein the different zones of at least one photosensor have a width substantially equal to a width of the photosensor array.

3. The dataform reading module of claim 2, wherein the width of the at least one photosensor is approximately 640 pixels.

4. The dataform reading module of claim 1, wherein the different zones of the at least one photosensor are substantially rectangular in shape and arranged vertically with respect to one another.

5. The dataform reading module of claim 1, further including imaging processing circuitry configured to receive pixel data from each zone of the at least one photosensor and reconstruct an image of the dataform captured along the target line.

6. The dataform reading module of claim 5, wherein the imaging processing circuitry is configured to discard duplicate pixel data from the different zones during reconstruction of the image.

7. The dataform reading module of claim 1, wherein the illumination device is a laser.

8. The dataform reading module of claim 1, wherein the illumination device includes at last one light emitting diode.

9. The dataform reading module of claim 1, wherein the target dataform is a one-dimensional barcode.

10. The dataform reading module of claim 1, wherein the target line is in a substantially horizontal direction with respect to the dataform.

11. The dataform reading module of claim 1, wherein the optics are lenses.

12. The dataform reading module of claim 11, wherein the lenses are formed on a single substrate.

13. A dataform reader for reading a dataform, comprising:
    a hand-portable sized housing;
    a reading module included within the housing, the reading module including:
    a photosensor array having a plurality of different zones;
    a plurality of optics for focusing a respective image representing a portion of the dataform along a target line onto a respective one of the plurality of different zones, at least two of the plurality of optics configured to focus an image of adjacent and partially overlapping portions of the dataform along the target line; and an illuminating device for illuminating the dataform.

14. The dataform reader of claim 13, further comprising an RF transceiver coupled to the reading module for transmitting and receiving wireless data.

15. The dataform reader of claim 13, further comprising a rechargeable battery disposed in the housing for providing power to the dataform reader.

16. The dataform reader claim 13, wherein the different zones of photosensor array each have a width substantially equal to a width of the photosensor array.

17. The dataform reader of claim 13, wherein the different zones of the photosensor array are substantially rectangular in shape and arranged vertically with respect to one another.

18. The dataform reader of claim 13, further including imaging processing circuitry configured to receive pixel data from each zone of the photosensor array and reconstruct an image of the dataform captured along the target line.

19. The dataform reader of claim 18, wherein the imaging processing circuitry is configured to discard duplicate pixel data from the different zones during reconstruction of the image.

20. A method for reading a dataform using a dataform reading module, comprising the steps of:

focusing a plurality of images of a dataform onto respective zones of a photosensor array, at least two of the images corresponding to adjacent and partially overlapping segments of the dataform taken along a target line; and reconstructing a final image of the dataform taken along the target line from a combination of the plurality of images provided to the respective zones.

21. The method of claim 20, wherein a plurality of lenses are used to focus a corresponding plurality of images of the dataform onto the respective zones.

22. The method of claim 20, wherein the plurality of zones are substantially rectangular in shape and arranged vertically with respect to one another.

23. The method of claim 22, wherein the step of reconstructing the final image includes the steps of:

streaming together the plurality of images provided to the respective zones into a single image; and discarding images of duplicate portions of the dataform stored in each of the respective zones.

24. The method of claim 20, further including the step of illuminating the dataform prior to the step of focusing.

25. The method of claim 24, wherein the step of illuminating is by way of a laser light.

26. A dataform reading module, comprising:

means for capturing images of a dataform;

means for focusing images of adjacent portions of the dataform onto respective different regions of the means for capturing, wherein the adjacent portions of the dataform partially overlap with one another; and means for combining the images of the adjacent portions to a single image of the dataformn.

27. The dataform reading module of claim 26, wherein the means for combining includes circuitry for discarding duplicate data stored in each of the different zones.

28. The dataform reading module of claim 26, wherein the different regions are substantially rectangular in shape and arranged vertically with respect to one another.

* * * * *